(12) United States Patent
Baath et al.

(10) Patent No.: US 11,877,574 B2
(45) Date of Patent: Jan. 23, 2024

(54) HERBICIDAL OIL DISPERSION AND METHOD

(71) Applicant: Arysta LifeScience Inc., Cary, NC (US)

(72) Inventors: Bhupinder Baath, Davis, CA (US); Stephen Craig Bennett, Valdosta, GA (US); Hong Zhang, Cary, NC (US); Carlton Stephen Seckinger, Valdosta, GA (US)

(73) Assignee: ARYSTA LIFESCIENCE INC., Cary, NC (US)

( * ) Notice: Subject to any disclaimer, the term of this patent is extended or adjusted under 35 U.S.C. 154(b) by 283 days.

(21) Appl. No.: 16/566,312

(22) Filed: Sep. 10, 2019

(65) Prior Publication Data

US 2020/0077645 A1 Mar. 12, 2020

Related U.S. Application Data

(60) Provisional application No. 62/729,747, filed on Sep. 11, 2018.

(51) Int. Cl.
| | | |
|---|---|---|
| *A01N 25/04* | (2006.01) | |
| *A01N 25/30* | (2006.01) | |
| *A01N 37/34* | (2006.01) | |
| *A01N 43/42* | (2006.01) | |
| *A01N 43/40* | (2006.01) | |
| *A01N 43/653* | (2006.01) | |

(52) U.S. Cl.
CPC .............. *A01N 25/04* (2013.01); *A01N 25/30* (2013.01); *A01N 37/34* (2013.01); *A01N 43/40* (2013.01); *A01N 43/42* (2013.01); *A01N 43/653* (2013.01)

(58) Field of Classification Search
CPC ...... A01N 43/40; A01N 43/653; A01N 43/42; A01N 25/08; A01N 25/30; A01N 37/34
See application file for complete search history.

(56) References Cited

U.S. PATENT DOCUMENTS

| | | |
|---|---|---|
| 5,834,400 A | 11/1998 | Narayanan et al. |
| 2009/0111695 A1* | 4/2009 | Jensen ............... A01N 43/40 504/130 |
| 2015/0196030 A1* | 7/2015 | Degenhardt ........ A01N 43/40 504/105 |
| 2018/0177182 A1 | 6/2018 | Kolb et al. |

FOREIGN PATENT DOCUMENTS

| | | |
|---|---|---|
| DE | 198346291 | * 12/1998 |
| WO | 2011/095735 | 8/2011 |

OTHER PUBLICATIONS

International Search Report issued in PCT/US2019/050425, dated Nov. 27, 2019.
Written Opinion of the International Searching Authority issued in PCT/US2019/050425, dated Nov. 27, 2019.
U.S. Appl. No. 62/729,747, filed Sep. 11, 2018.

* cited by examiner

*Primary Examiner* — Johann R Richter
*Assistant Examiner* — Danielle Sullivan
(74) *Attorney, Agent, or Firm* — CANTOR COLBURN LLP

(57) ABSTRACT

An herbicidal composition and method. An herbicidal composition including of one or more herbicidally active ingredients dissolved and/or suspended in an MCPA-2-ethylhexyl carrier, where the active ingredient carrier is otherwise oil and solvent free and the composition is chemically and physically stable. A method of preparing an herbicidal composition and a method of controlling weeds are also described.

16 Claims, No Drawings

ND METHOD

HERBICIDAL OIL DISPERSION AND METHOD

CROSS-REFERENCE TO RELATED APPLICATION

This application claims the benefit of U.S. Provisional Application No. 62/729,747 filed Sep. 11, 2018, the disclosure of which is expressly incorporated by reference herein in its entirety.

TECHNICAL FIELD

The field of art to which this invention generally pertains is herbicidal compositions.

BACKGROUND

Chemical and physical stability are constant challenges which can exist with herbicidal formulations, especially with some active chemicals which are extremely effective individually, but can interact at various temperatures over time when they are combined with other materials.

Accordingly, there is a constant search for enhancing the stability of effective herbicidal chemical combinations.

BRIEF SUMMARY

An herbicidal composition is described including one or more herbicidally active ingredients dissolved and/or suspended in an MCPA-2-ethylhexyl active ingredient carrier, wherein the active ingredient carrier is otherwise oil and solvent free and the composition is chemically and physically stable.

Additional embodiments include: the composition described above where the one or more active ingredients comprise Flucarbazone Sodium, Cloquintocet Mexyl, Fluroxypyr Meptyl, and/or Bromoxynil Octanoate; the composition described above additionally containing one or more dispersants; the composition described above where the one or more dispersants comprise polymeric ester dispersants, polymer dispersants, and/or modified styrene acrylic copolymer dispersants; the composition described above additionally containing one or more emulsifiers; the composition described above where the one or more emulsifiers comprise polyoxyethylene sorbitol hexaoleate, ethoxylated isotridecanol, and/or sodium dioctyl sulphosuccinate; the composition described above additionally containing one or more rheology modifiers; the composition described above where the rheology modifiers comprise organoclay; the composition described above wherein the rheology modifier comprises BENTONE® 1000; the composition described above where the composition demonstrates weed control on multiple grasses, broadleaf weeds and sedge; the composition described above where the herbicidally active ingredients are present: in an amount from about 2 percent to about 80 percent by weight of the composition; the composition described above where the dispersant is present in a range of about 0.1 to about 20.0 percent by weight of the composition; the composition described above where the emulsifier includes one or more nonionic surfactants selected from the group consisting of fatty alcohol ethoxylates, tristyrylphenol ethoxylates, alkylphenolethoxylates, castor oil ethoxylates, fatty acid ethoxylates, alkylpolyglucosides, sorbitan ethoxylates, and ethylene oxide-propylene oxide-ethylene oxide block copolymers; the composition described above where the emulsifier includes one or more anionic surfactants selected from the group consisting of salts of dodecylbenzenesulfonate, sodium dioctylsulfosuccinate, salts of tristyrylphenol ethoxylate phosphates, salts of fatty acids, salts of alkyl sulfates, salts of alkylether sulfates, salts of alkylether phosphates, and sodium N-methyl-N-oleyltaurate; the composition described above where the emulsifier is present in a range from about 0.1 to about 20 percent by weight; the composition described above where the rheology modifier is a hydrophobic fumed silica, bentonite, castor wax, magnesium stearate, aluminum/magnesium hydroxide stearate, or polymeric thickener, or combinations thereof; the composition described above where the composition comprises about 0.01 to about 10 percent by weight of the rheology modifier; the composition described above additionally containing one or more additives comprising an absorbent, an antifoaming agent, a stabilizer, an antifreeze agent, a base, an acid, and a buffer.

A method of preparing an herbicidal composition is also described including combining one or more herbicidally active ingredients in an MCPA-2-ethylhexyl active ingredient carrier, where the active ingredient carrier is otherwise oil and solvent free.

A method of controlling weeds is also described including diluting the herbicidal composition described above with water and applying the diluted herbicidal composition to one or more crops.

Additional embodiments include: the method described above where the applying step is performed post-emergently after the one or more crops break ground; and the method described above where the applying step is performed pre-emergently before the one or more crops break ground.

These, and additional embodiments, are described below.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

What is described herein is an effective herbicidal composition against a broad weed spectrum, having chemical stability of all of active ingredients. 2-ethylhexyl 2-(4-chloro-2-methylphenoxy) acetate (MCPA-2-ethylhexyl) is a common herbicide used in agricultural formulations. As described herein, this formulation can be used as an oil dispersion (OD), even though it contains no typical solvent or oil. Instead the MCPA-2-ethylhexyl herbicide is used at the solvent/oil itself.

Using the MCPA-2-ethylhexyl as the solvent/oil allows it to be combined with various dispersants to disperse the various active ingredient particles in the oil phase such that they don't agglomerate or settle. Typically multiple dispersants are used to disperse the particles, e.g., first in the oil phase, and then in water, and function to keep the formulations physically and chemically stable. These dispersants include combinations of specific emulsifiers and polymers that interact with additional (e.g., up to five) active ingredients to keep the entire composition sizable, dispersed, and emulsifiable.

For example, the interaction between rheology modifiers (e.g., organoclays such as BENTONE® 1000-Elementis) and MCPA-2-ethylhexyl is extremely positive, with little or no separation upon storage. Rheology modifiers are typically used in formulations that include solvents or oils as carriers. The formulations described herein have no oil or solvent and use the MCPA-2-ethylhexyl as the solvent/carrier. This rheology system is capable of stably suspending up to 5 active ingredients with a reasonable particle size range, such as D50 from 1 to 10 microns (D50 representing the diameter at which 50% of the sample's mass is comprised of particles with a diameter less than this value). In addition to developing an OD formulation by using the MCPA-2-ethylhexyl, it can significantly increase the total loading of active ingredients. For example, in addition to the MCPA-2-ethylhexyl, additional active ingredients such as Flucarbazone Sodium, Cloquintocet, Mexyl, Fluroxypyr Meptyl, and Bromoxynil Octanoate can be added to the formulation.

In addition to the active ingredients, emulsifiers such as Polyoxyethylene sorbitol hexaoleate, Ethoxylated Isotridecanol, and Sodium Dioctyl Sulphosuccinate; dispersants such as Polymeric Ester Dispersant—Atlox 4916 (Croda), Polymer Dispersant—Atlox 4912 or Atlox 4914 (Croda), and Modified styrene acrylic copolymer dispersant—Atlox Metasperse 550S, Atlox Metasperse 500L, or Atlox Metasperse 100L and rheology modifiers such as Organoclay—BENTONE® 1000 (Elementis) may also be used.

In the herbicidal formulation area it has been found challenging to develop formulations with stable chemistry. However, it has been discovered that the desired degree of chemical stability of the ingredients is attained in an herbicidal oil dispersion formulation using the above described ingredients.

By being able to include a high number of active ingredient with chemical stability into such an herbicidal formulation, a significantly increased control spectrum of weed management can be attained, for example, i.e., addition of each active ingredient increases the spectrum of weeds which can be controlled.

TABLE 1

| Composition A | g/L (grams per liter) | % (by weight) | Function |
|---|---|---|---|
| Polyoxyethylene (40) sorbitol hexaoleate - (40 indicating moles of ethylene oxide) | 151.27 | 12.82 | Emulsifier |
| (Flucarbazone Sodium (94%) | 21.48 | 1.82 | Herbicide |
| Cloquintocet Mexyl (95%) | 4.25 | 0.36 | Herbicide |
| Fluroxypyr Meptyl (98%) | 130.27 | 11.04 | Herbicide |
| Bromoxynil Octanoate (98%) | 351.17 | 29.76 | Herbicide |
| MCPA-2-ethyhexyl (93.4%) | 375.24 | 31.80 | Herbicide |
| Polymeric Ester Dispersant - Atlox 4916 (Croda) | 16.52 | 1.4 | Dispersant |
| Ethoxylated Isotridecanol | 47.2 | 4.00 | Emulsifier |
| Polymer Dispersant - Atlox 4912 or Atlox 4914 (Croda) | 8.26 | 0.70 | Dispersant |
| Sodium Dioctyl Sulphosuccinate | 59 | 5.00 | Emulsifier |
| Organoclay - BENTONE ® 1000 (Elementis) | 15.34 | 1.30 | Rheology Aid |

| | g/L | % | Function |
|---|---|---|---|
| Composition B | | | |
| Polyoxyethylene (40) sorbitol hexaoleate | 139.47 | 11.82 | Emulsifier |
| Flucarbazone Sodium (94%) | 21.48 | 1.82 | Herbicide |
| Cloquintocet Mexyl (95%) | 4.25 | 0.36 | Herbicide |
| Fluroxypyr Meptyl (98%) | 130.27 | 11.04 | Herbicide |
| Bromoxynil Octanoate (98%) | 351.17 | 29.76 | Herbicide |
| MCPA-2-ethyhexyl (93.4%) | 375.24 | 31.80 | Herbicide |
| Polymeric Ester Dispersant - Atlox 4916 (Croda) | 16.52 | 1.4 | Dispersant |
| Ethoxylated Isotridecanol | 47.2 | 4.00 | Emulsifier |
| Polymer Dispersant - Atlox 4912 or Atlox 4914 (Croda) | 8.26 | 0.70 | Dispersant |
| Sodium Dioctyl Sulphosuccinate | 59 | 5.00 | Emulsifier |
| Organoclay - BENTONE ® 1000 (Elementis) | 15.34 | 1.30 | Rheology Aid |
| Modified styrene acrylic copolymer dispersant - Atlox Metasperse 550S, Atlox Metasperse 500L, or Atlox Metasperse 100L | 11.80 | 1.00 | Dispersant |
| Composition C | | | |
| Polyoxyethylene (40) sorbitol hexaoleate | 139.47 | 11.82 | Emulsifier |
| Flucarbazone Sodium (94%) | 21.48 | 1.82 | Herbicide |
| Cloquintocet Mexyl (95%) | 4.25 | 0.36 | Herbicide |

TABLE 1-continued

| | | | |
|---|---|---|---|
| Fluroxypyr Meptyl (98%) | 130.27 | 11.04 | Herbicide |
| Bromoxynil Octanoate (98%) | 351.17 | 29.76 | Herbicide |
| MCPA-2-ethyhexyl (93.4%) | 375.24 | 31.80 | Herbicide |
| Polymeric Ester Dispersant - Atlox 4916 (Croda) | 16.52 | 1.4 | Dispersant |
| Ethoxylated Isotridecanol | 47.2 | 4.00 | Emulsifier |
| Polymer Dispersant - Atlox 4912 or Atlox 4914 (Croda) | 8.26 | 0.70 | Dispersant |
| Sodium Dioctyl Sulphosuccinate | 59 | 5.00 | Emulsifier |
| Confidential Organoclay | 15.34 | 1.30 | Rheology Aid |
| Castor Oil Ethoxylate | 11.80 | 1.00 | Emulsifier |

Composition D

| | | | |
|---|---|---|---|
| Polyoxyethylene (40) sorbitol hexaoleate | 149.5 | 12.67 | Emulsifier |
| Flucarbazone Sodium (94%) | 21.48 | 1.82 | Herbicide |
| Cloquintocet Mexyl (95%) | 4.25 | 0.36 | Herbicide |
| Fluroxypyr Meptyl (98%) | 130.27 | 11.04 | Herbicide |
| Bromoxynil Octanoate (98%) | 351.17 | 29.76 | Herbicide |
| MCPA-2-ethyhexyl (93.4%) | 375.24 | 31.80 | Herbicide |
| Polymeric Ester Dispersant - Atlox 4916 (Croda) | 16.52 | 1.4 | Dispersant |
| Ethoxylated Isotridecanol | 47.2 | 4.00 | Emulsifier |
| Polymer Dispersant - Atlox 4912 or Atlox 4914 (Croda) | 8.26 | 0.70 | Dispersant |
| Sodium Dioctyl Sulphosuccinate | 59 | 5.00 | Emulsifier |
| Confidential Organoclay | 15.34 | 1.30 | Rheology Aid |
| Silicon Emulsion | 1.77 | 0.15 | Antifoam |

Table 1 demonstrates representative examples of compositions as described herein. Tables 2 and 3 demonstrate physical and chemical stability of compositions described herein. The benefits and details demonstrated in the Tables are for multiple exemplary compositions, demonstrating their stability at various time periods and temperatures. The compositions also demonstrate physical property stability at low temperatures, such as phase separation stability, formulation uniformity, particle size stability, emulsion stability, etc.

As mentioned above, the novel ready-mix herbicidal compositions described herein are effective on a broader weed spectrum, such as, for example on grasses, broadleaf weeds and sedge, which is not the case with the individual herbicidal components alone. Typically the components are present in an amount of about 10% to about 80% (for example, 10%, 20%, 30%, 40%, 50%, 60%, 70%, 80%) by weight, and for most uses the higher the loading the more efficient the application process, e.g., when treating large acreage and

TABLE 2

| | Interval | | | | | | | |
|---|---|---|---|---|---|---|---|---|
| | specification | initial | F/T Sample | 2 wks | 1 month storage | | | |
| Temp (° C.) | N/A | N/A | N/A | 54 | −10 | 0 | T/C | 40 |
| Assay (% w/w) Flucarbazone | 1.90 | 1.91 | 1.92 | 1.90 | 1.90 | 1.89 | 1.90 | 1.90 |
| Recovery | | | 100.26 | 99.45 | 99.63 | 99.07 | 99.55 | 99.49 |
| Assay (% w/w) cloquintocet | 0.40 | 0.41 | 0.41 | 0.39 | 0.41 | 0.41 | 0.41 | 0.41 |
| Recovery | | | 99.99 | 94.89 | 100.41 | 99.20 | 99.67 | 100.42 |
| Assay (% w/w) Fluroxypyr | 11.48 | 11.60 | 11.61 | 11.63 | 11.49 | 11.47 | 11.52 | 11.50 |
| Recovery | | | 100.13 | 100.33 | 99.07 | 98.90 | 99.31 | 99.18 |
| Assay (% w/w) Bromoxynil | 31.01 | 31.32 | 31.42 | 31.02 | 31.44 | 31.04 | 31.27 | 31.46 |
| Recovery | | | 100.33 | 99.06 | 100.38 | 99.12 | 99.84 | 100.47 |
| Assay (% w/w) MCPA | 33.14 | 35.01 | 35.06 | 35.05 | 34.65 | 34.61 | 34.68 | 34.69 |
| Recovery | | | 100.16 | 100.12 | 98.99 | 99.88 | 99.07 | 99.10 |
| Initial Density g/ml@20° C. | 1.118 g/ml | | | | | | | |
| Bleed (%) | | 0.0000 | 0.0 | 0.0 | 0.0 | 0.0 | 0.0 | 0.0 |
| Sediment (Y/N) | | N | N | N | N | N | N | N |
| 2% Dilution in 324 ppm WHO SHW Ml separation at | | | | | | | | |
| 1 Hour | | | | 0 | 0 | 0 | 0 | 0 |
| 2 Hour | | | | 0 | 0 | 0 | 0 | 0 |
| 24 Hour | | | | trace | trace | trace | trace | trace |
| Wet sieve | | | | | | | | |
| pH neat | | 4.77 | | 4.57 | 4.69 | 4.63 | 4.61 | 4.57 |
| Viscosity at 20° C. | | 370 | | | | | | |
| % moisture | | 0.2639 | | 0.2431 | 0.2302 | 0.2399 | 0.2309 | 0.2377 |
| Particle size | | | | | | | | |
| d(0.5 μm) | | 0.322 | 0.359 | 0.366 | 0.353 | 0.334 | 0.343 | 0.338 |
| d(0.9 μm) | | 2.83 | 2.66 | 3.35 | 2.51 | 3.79 | 3.45 | 3.5 |
| Microscopic appearance | | | | | | | | |

TABLE 2-continued

|  | Interval 2 month storage | | | |
|---|---|---|---|---|
| Temp (° C.) | −10 | 0 | T/C | 40 |
| Assay (% w/w) Flucarbazone | 1.93 | 1.93 | 1.93 | 1.91 |
| Recovery | 101.11 | 101.11 | 101.15 | 100.19 |
| Assay (% w/w) cloquintocet | 0.41 | 0.41 | 0.40 | 0.40 |
| Recovery | 99.39 | 100.55 | 98.51 | 96.83 |
| Assay (% w/w) Fluroxypyr | 11.55 | 11.56 | 11.55 | 11.56 |
| Recovery | 99.58 | 99.57 | 99.66 | 99.70 |
| Assay (% w/w) Bromoxynil | 31.34 | 31.30 | 30.99 | 30.78 |
| Recovery | 100.08 | 99.61 | 98.96 | 98.28 |
| Assay (% w/w) MCPA | 34.92 | 34.82 | 34.94 | 34.90 |
| Recovery | 99.74 | 99.46 | 99.82 | 99.69 |
| Initial Density g/ml@20° C. | | | | |
| Bleed (%) | 0.0 | 0.0 | 0.0 | 0.0 |
| Sediment (Y/N) | N | N | N | N |
| 2% Dilution in 324 ppm WHO SHW Ml separation at | | | | |
| 1 Hour | 0 | 0 | 0 | 0 |
| 2 Hour | 0 | 0 | 0 | 0 |
| 24 Hour | trace | trace | trace | trace |
| Wet sieve | | | | |
| pH neat | 4.59 | 4.42 | 4.39 | 4.39 |
| Viscosity at 20° C. | | | | |
| % moisture | 0.2480 | 0.2480 | 0.2836 | 0.2516 |
| Particle size | | | | |
| d(0.5 μm) | 0.349 | 0.43 | 0.323 | 0.342 |
| d(0.9 μm) | 2.32 | 2.92 | 2.64 | 2.89 |
| Microscopic appearance | | | | |

|  | Interval | | | | | 6 month storage | 9 month storage | 12 month storage |
|---|---|---|---|---|---|---|---|---|
|  | 3 month storage | | | | | | | |
| Temp (° C.) | −10 | 0 | 25 | T/C | 40 | 25 | 25 | 25 |
| Assay (% w/w) Flucarbazone | 1.99 | 1.98 | 1.99 | 1.98 | 1.94 | 1.92 | 1.92 | 1.92 |
| Recovery | 104.25 | 103.62 | 103.93 | 103.77 | 101.79 | 100.63 | 100.31 | 99.59 |
| Assay (% w/w) cloquintocet | 0.42 | 0.41 | 0.41 | 0.41 | 0.40 | 0.39 | 0.39 | 0.39 |
| Recovery | 101.59 | 101.26 | 100.43 | 99.07 | 98.78 | 96.08 | 94.44 | 96.11 |
| Assay (% w/w) Fluroxypyr | 11.71 | 11.63 | 11.68 | 11.71 | 11.69 | 11.36 | 11.56 | 11.63 |
| Recovery | 101.00 | 100.31 | 100.73 | 100.95 | 100.83 | 97.99 | 99.66 | 100.33 |
| Assay (% w/w) Bromoxynil | 33.06 | 32.81 | 32.57 | 32.54 | 32.17 | 31.38 | 32.11 | 31.19 |
| Recovery | 105.56 | 104.75 | 103.99 | 103.91 | 102.71 | 100.19 | 102.54 | 99.59 |
| Assay (% w/w) MCPA | 35.36 | 35.25 | 35.23 | 35.30 | 35.28 | 34.14 | 34.73 | 34.84 |
| Recovery | 101.01 | 100.69 | 100.64 | 100.84 | 100.78 | 97.53 | 99.20 | 99.51 |
| Initial Density g/ml@20° C. | | | | | | | | |
| Bleed (%) | 0.0 | 0.0 | 0.0 | 0.0 | 0.0 | 0.0 | 0.0 | 0.0 |
| Sediment (Y/N) | N | N | N | N | N | N | N | N |
| 2% Dilution in 324 ppm WHO SHW Ml separation at | | | | | | 2% Dilution in 342 ppm WHO SHW ml separation at | | |
| 1 Hour | 0 | 0 | 0 | 0 | 0 | 0 RT - 20 ppm (Bloom/Inv/1 hr/2 hr/24/crystals?) | | |
| 2 Hour | 0 | 0 | 0 | 0 | 0 | 0 RT - 342 ppm (Bloom/Inv/1 hr/2 hr/24/crystals?) | P/5/0/0/<.05/<.05/ no | |

TABLE 2-continued

| 24 Hour Wet sieve | trace | trace | trace | trace | trace | trace | RT - 1000 ppm (Bloom/Inv/1 hr/2 hr/24/crystals?) | | |
|---|---|---|---|---|---|---|---|---|---|
| | | | | | | | 2 C. - 20 ppm (Bloom/Inv/1 hr/2 hr/24/crystals?) | | |
| | | | | | | | 2 C. - 342 ppm (Bloom/Inv/1 hr/2 hr/24/crystals?) | P/8/0/0/.05/.05/no | |
| | | | | | | | 2 C. - 1000 ppm (Bloom/Inv/1 hr/2 hr/24/crystals?) | 0.015 | P > 1/0/ 05/.10/no 25 |
| pH neat | 5.98 | 5.83 | 5.71 | 5.75 | 5.65 | 4.50 | | 4.4 | 4.5 |
| Viscosity at 20° C. | | | | | | | | | 500 |
| % moisture | 0.2331 | 0.2440 | 0.2909 | 0.2598 | 0.2438 | 0.335 | | 0.422 | 0.272 |
| Particle size | | | | | | | | | |
| d(0.5 µm) | 0.414 | 0.36 | 0.379 | 0.336 | 0.34 | 1.80 | | 1.84 | 0.724 |
| d(0.9 µm) | 2.62 | 2.44 | 2.87 | 3.13 | 2.96 | 3.30 | | 4.27 | 3.15 |
| Microscopic appearance | | | | | | | | | |

FT = Freeze/Thaw −10° C. to 20° C. = Temperature Cycle 0, 20, 40° C.;
% w/w = weight/weight percent;
WHO SHW = World Health Organization Standard Hard Water;
d(0.5) of the particle are less than the number;
Bloom/Inv = Bloom or spontaneity when dispersed in water/Inversions it take to disperse;
P = Poor,
G = Good

TABLE 3

| | | | | | 1 month storage | | |
|---|---|---|---|---|---|---|---|
| | Specification | Initial | F/T sample | 2 wks | | | |
| Temp (° C.) | N/A | N/A | N/A | 54 | 0 | T/C | 40 |
| SCB239-12 | | | | | | | |
| Flucarbazone - Sodium | 1.82 | 1.81 | 1.80 | 1.68 | 1.81 | 1.83 | 1.85 |
| Assay (% w/w) | | | 99.26 | 92.84 | 99.67 | 101.13 | 101.98 |
| cloquintocet | 0.36 | 0.35 | 0.36 | 0.35 | 0.35 | 0.35 | 0.35 |
| Assay (% w/w) | | | 101.49 | 100.70 | 100.15 | 99.83 | 99.58 |
| Fluroxypyr meptyl | 11.04 | 11.32 | 11.28 | 11.26 | 11.25 | 11.25 | 11.24 |
| Assay (% w/w) | | | 99.68 | 99.48 | 99.37 | 99.36 | 99.33 |
| bromoxynil | 29.76 | 31.22 | 31.13 | 30.55 | 31.08 | 30.89 | 30.65 |
| Assay (% w/w) | | | 99.73 | 97.86 | 99.56 | 98.95 | 98.17 |
| MCPA | 31.8 | 33.69 | 34.30 | 34.24 | 33.65 | 33.64 | 33.61 |
| Assay (% w/w) | | | 101.84 | 101.65 | 99.88 | 99.85 | 99.77 |
| Initial Density g/ml | 1180 | 1172 | | | | | |
| Bleed (%) | | | 0 | 0 | 0 | 0 | 0 |
| Sediment (N, T, S, M, H) | | | N | N | N | N | N |
| % Moisture (KF) | 0.4% max | 0.188 | 0.226 | 0.193 | 0.219 | 0.243 | 0.392 |
| Wet sieve | 0 | 0 | 0.0045 | 0.0038 | 0.0195 | 0.0201 | 0.017 |
| pH 1% | 6 | 5.38 | 4.68 | 4.53 | 5.05 | 4.74 | 4.62 |
| Dispersion Stability -ml sediment (1.24 kg) | | | | | | | |
| RT- 20 ppm (Bloom/Inv/1 hr/2 hr/24/ crystals?) | | P/6/<0.05/ 0.05/0.20/ no | | | | | |
| RT- 342 ppm (Bloom/Inv/1 hr/2 hr/24/ crystals?) | | P/10/0/ <0.05/0.15/ no | P/7/0/<0.05/ 0.05/no | P/11/0/<0.05/ 0.05/no | P/7/0/T/ 0.10/no | P/9/T/05/ 0.15/no | P/7/T/.05/ 0.10/no |
| RT- 1000 ppm (Bloom/Inv/1 hr/2 hr/24/ crystals?) | | P/10/0/0/ 0.05/no | | | | | |
| 2 C.- 20 ppm (Bloom/Inv/1 hr/2 hr/24/ crystals?) | | P/17/0/ <0.05/<0.05/ 0.10/no | | | | | |
| 2 C.- 342 ppm (Bloom/Inv/1 hr/2 hr/24/ 3.27crystals?) | | P/22/0/ <0.05/0.10/no | P/24/<.05/15/ 15/no | P/26/<05/ .10/.10/no | P/13/.10/ 20/25/no | P/22/T/05/ 0.10/no | P/12/T/.05/ 0.15/no |

TABLE 3-continued

| | | | | | | | |
|---|---|---|---|---|---|---|---|
| 2 C.- 1000 ppm (Bloom/Inv/1 hr/2 hr/24/ crystals?) | | P/20/0/0/ 0.10/no | | | | | |
| Viscosity | 600 max | 440 cP | | 650 | | | |
| Particle Size | | | | | | | |
| D(0.5 μm) | | 3.69 | 2.92 | 3.27 | 3.02 | 3.05 | 3.03 |
| D(0.9 μm) | 7 | 7.32 | 8.79 | 7.36 | 9.58 | 7.49 | 7.4 |

| | Interval | | | | | | |
|---|---|---|---|---|---|---|---|
| | 2 month storage | | | 3 month storage | | | |
| Temp (° C.) | 0 | T/C | 40 | −10 | 0 | 25 | 40 |
| SCB239-12 | | | | | | | |
| Flucarbazone - Sodium | '1.81 | 1.82 | 1.80 | 1.78 | 1.80 | 1.79 | 1.72 |
| Assay (% w/w) | 99.76 | 100.35 | 99.54 | 98.44 | 99.13 | 98.51 | 95.13 |
| cloquintocet | 0.36 | 0.36 | 0.35 | 0.35 | 0.35 | 0.35 | 0.35 |
| Assay (% w/w) | 100.12 | 101.08 | 100.02 | 99.59 | 100.75 | 100.17 | 99.39 |
| Fluroxypyr meptyl | 11.19 | 11.17 | 11.13 | 11.13 | 11.23 | 11.20 | 11.21 |
| Assay (% w/w) | 98.83 | 98.68 | 98.36 | 98.30 | 99.21 | 98.92 | 99.04 |
| bromoxynil | 30.30 | 29.88 | 29.43 | 30.49 | 30.06 | 30.03 | 29.37 |
| Assay (% w/w) | 97.06 | 95.73 | 94.28 | 97.68 | 96.31 | 96.21 | 94.07 |
| MCPA | 34.07 | 33.97 | 33.84 | 33.41 | 33.76 | 33.64 | 33.61 |
| Assay (% w/w) | 101.15 | 100.84 | 100.47 | 99.20 | 100.21 | 99.86 | 99.76 |
| Initial Density g/ml | | | | | | | |
| Bleed (%) | 0 | 0 | 0 | 0 | 0 | 0 | 0 |
| Sediment (N, T, S, M, H) | T in corners | T in corners | T in corners | N | N | N | N |
| % Moisture (KF) | 0.257 | 0.26 | 0.254 | 0.1843 | 0.203 | 0.185 | 0.1794 |
| Wet sieve | 0.097 | 0.091 | 0.095 | 0.186 | 0 | 0.169 | 0.156 |
| pH 1% | 4.77 | 4.55 | 4.43 | 4.84 | 4.88 | 4.79 | 4.51 |
| Dispersion Stability -ml sediment (1.24 kg) | | | | | | | |
| RT- 20 ppm (Bloom/Inv/1 hr/2 hr/24/ crystals?) | | | | | | | |
| RT- 342 ppm (Bloom/Inv/1 hr/2 hr/24/ crystals?) | P/7/0/<0.05/ 0.10/no | P/6/T/.05/.15/ no | P/8/T/.05/.15/ no | P/10/0/ <0.05/0.15/no | P/10/0/ <0.05/0.15/no | P/10/0/ <0.05/0.15/no | P/10/0/ <0.05/0.15/no |
| RT- 1000 ppm (Bloom/Inv/1 hr/2 hr/24/ crystals?) | | | | | | | |
| 2 C.- 20 ppm (Bloom/Inv/1 hr/2 hr/24/ crystals?) | | | | | | | |
| 2 C.- 342 ppm (Bloom/Inv/1 hr/2 hr/24/ 3.27crystals?) | P/10/T/<.05/ 05/.25/no | P/12/T/.05/ 0.15/0.20/no | P/14/.05/.10/ .15/no | P/13/.05/ .20/.25/no | P/15/.05/ .15/20/no | P/12/.05// .20/25/no | P/13/05/ .15/.15/no |
| 2 C.- 1000 ppm (Bloom/Inv/1 hr/2 hr/24/ crystals?) | | | | | | | |
| Viscosity | | | | | | 560 | |
| Particle Size | | | | | | | |
| D(0.5 μm) | 2.88 | 3.1 | 3.16 | 2.91 | 3.25 | 3.03 | 3.05 |
| D(0.9 μm) | 6.69 | 7.22 | 7.4 | 7.08 | 12.1 | 7.43 | 7.01 |

F/T = Freeze/Thaw cycle;
Sediment (NTSMH) = amount of sediment (N = None/T = Trace/S = Soft packing/H = Hard packing);
2 C. = 2 degrees C.

considering such things as lower cost of transportation. When diluted with water, the pre-mix is typically present in an amount of about 0.01% to about 50% by weight, for example, for typical ground sprayer (lower concentrations) or aerial tank or drone (higher concentrations) applications.

The product also has extended shelf life, e.g., expected to be at least two years. The delivery system also has an acceptable toxicity profile according to current MSDS (Material Safety Data. Sheets) data.

As described above, most OD matrices use oil based solvents, and especially aromatic solvents. The compositions described herein use low melting point active ingredients, with enhanced compatibility when mixed with various materials such as dispersants and rheology aids. The compositions typically exist in liquid form at room temp, even at temperatures as low as minus 10° C. Because of the lack of need for solvents, the compositions described herein are capable of very high loading, e.g., up to 80% by weight of the multiple active ingredients described herein. This compares to less than 50% by weight, for example, with typical solvent containing compositions. This presents clear benefits to the user, e.g., longer spraying times per tank, As described herein, these problems and others in this area are addressed by the invention described herein. Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An herbicidal composition comprising:
   herbicidally active ingredients comprising flucarbazone sodium, cloquintocet mexyl, fluroxypyr meptyl, and bromoxynil octanoate dissolved and/or suspended in an MCPA-2-ethylhexyl active ingredient carrier, and
   0.01 to 10% by weight of at least one rheology modifier selected from hydrophobic fumed silica, bentonite, castor wax, magnesium stearate, aluminum, magnesium hydroxide stearate, and a combination thereof,
   wherein the composition is oil and solvent free, and
   wherein the composition exhibits no detectable sediment after storage for at least 6 months at 25° C.

2. The composition of claim 1, additionally containing one or more dispersants.

3. The composition of claim 2, wherein the one or more dispersants comprise polymeric ester dispersants, polymer dispersants, and/or modified styrene acrylic copolymer dispersants.

4. The composition of claim 1, additionally containing one or more emulsifiers.

5. The composition of claim 4, wherein the one or more emulsifiers comprise polyoxyethylene sorbitol hexaoleate, ethoxylated isotridecanol, and/or sodium dioctyl sulphosuccinate.

6. The composition of claim 1, wherein the herbicidally active ingredients are present in an amount from about 2 percent to about 80 percent by weight of the composition.

7. The composition of claim 2, wherein the dispersant is present in a range of about 0.1 to about 20.0 percent by weight of the composition.

8. The composition of claim 4, wherein the emulsifier includes one or more nonionic surfactants selected from the group consisting of fatty alcohol ethoxylates, tristyrylphenol ethoxylates, alkylphenolethoxylates, castor oil ethoxylates, fatty acid ethoxylates, alkylpolyglucosides, sorbitan ethoxylates, and ethylene oxide propylene oxide-ethylene oxide block copolymers.

9. The composition of claim 4, wherein the emulsifier includes one or more anionic surfactants selected from the group consisting of salts of dodecylbenzenesulfonate, sodium dioctylsulfosuccinate, salts of tristyrylphenol ethoxylate phosphates, salts of fatty acids, salts of alkyl sulfates, salts of alkylether sulfates, salts of alkylether phosphates, and sodium N-methyl-N-oleyltaurate.

10. The composition of claim 4, wherein the emulsifier is present in a range from about 0.1 to about 20 percent by weight.

11. The composition of claim 1, additionally containing one or more additives comprising an absorbent, and antifoaming agent, a stabilizer, an antifreeze agent, a base, an acid, and a buffer.

12. A method of preparing an herbicidal composition comprising:
   combining herbicidally active ingredients comprising flucarbazone sodium, cloquintocet mexyl, fluroxypyr meptyl, and/or bromoxynil octanoate in an MCPA-2-ethylhexyl active ingredient carrier, and
   adding 0.01 to 10% by weight of at least one rheology modifier to the combination, wherein the rheology modifier is selected from a hydrophobic fumed silica, bentonite, castor wax, magnesium stearate, aluminum, magnesium hydroxide stearate, a polymeric thickener, and a combination thereof,
   wherein the active ingredient carrier is otherwise oil and solvent free, and
   wherein the composition exhibits no detectable sediment after storage for at least 6 months at 25° C.

13. A method of controlling weeds comprising:
   a. diluting the herbicidal composition of claim 1 with water; and
   b. applying the diluted herbicidal composition to one or more crops.

14. The method of claim 13, wherein the applying step is performed post-emergently after the one or more crops break ground.

15. The method of claim 13, wherein the applying step is performed pre-emergently before the one or more crops break ground.

16. An oil dispersion formulation comprising:
   herbicidally active ingredients consisting of flucarbazone sodium, cloquintocet mexyl, fluroxypyr meptyl, and bromoxynil octanoate;
   MCPA-2-ethylhexyl, wherein the herbicidally active ingredients are first herbicide is suspended and/or dissolved in the MCPA-2-ethylhexyl; and
   0.01 to 10% by weight of at least one rheology modifier selected from a hydrophobic fumed silica, bentonite, castor wax, magnesium stearate, aluminum, magnesium hydroxide stearate, a polymeric thickener, and a combination thereof, wherein the formulation is free of an oil or a solvent, wherein the oil dispersion exhibits no detectable sediment after storage for at least 6 months at 25° C.

* * * * *